(12) United States Patent
Roberts

(10) Patent No.: US 11,581,010 B2
(45) Date of Patent: Feb. 14, 2023

(54) DRONE ASSISTED SETUP FOR BUILDING SPECIFIC SOUND LOCALIZATION MODEL

(71) Applicant: Alarm.com Incorporated, Tysons, VA (US)

(72) Inventor: Aaron Lee Roberts, Centreville, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/338,325

(22) Filed: Jun. 3, 2021

(65) Prior Publication Data

US 2021/0383822 A1 Dec. 9, 2021

Related U.S. Application Data

(60) Provisional application No. 63/035,343, filed on Jun. 5, 2020.

(51) Int. Cl.

| | |
|---|---|
| *G10L 25/51* | (2013.01) |
| *H04R 1/40* | (2006.01) |
| *H04R 3/00* | (2006.01) |
| *G08B 21/18* | (2006.01) |
| *H04Q 9/00* | (2006.01) |
| *G05D 1/10* | (2006.01) |
| *G01C 21/00* | (2006.01) |
| *B64C 39/02* | (2023.01) |
| *G05D 1/00* | (2006.01) |

(52) U.S. Cl.
CPC ............ *G10L 25/51* (2013.01); *B64C 39/024* (2013.01); *G01C 21/383* (2020.08); *G01C 21/3841* (2020.08); *G05D 1/0094* (2013.01); *G05D 1/101* (2013.01); *G08B 21/18* (2013.01); *H04Q 9/00* (2013.01); *H04R 1/406* (2013.01); *H04R 3/005* (2013.01); *B64C 2201/146* (2013.01); *H04Q 2209/82* (2013.01); *H04R 2201/401* (2013.01)

(58) Field of Classification Search
None
See application file for complete search history.

(56) References Cited

U.S. PATENT DOCUMENTS

| | | | | |
|---|---|---|---|---|
| 9,880,256 | B2* | 1/2018 | Baxley | ................... G01S 5/02 |
| 11,082,667 | B2* | 8/2021 | Deyle | ................. G05D 1/0088 |
| 11,346,669 | B2* | 5/2022 | Aldeborgh | ............. G06N 20/00 |
| 2016/0107749 | A1* | 4/2016 | Mucci | ................. G08B 25/001 |
| | | | | 701/3 |

\* cited by examiner

*Primary Examiner* — Paul W Huber
(74) *Attorney, Agent, or Firm* — Fish & Richardson P.C.

(57) ABSTRACT

Techniques and systems are described for generating and using a sound localization model. A described technique includes obtaining for a building a sound sensor map indicating locations of first and second sound sensor devices in respective first and second rooms of the building; causing an autonomous device to navigate to the first room and to emit, during a time window, sound patterns at one or more frequencies within the first room; receiving sound data including first and second sound data respectively from the first and second sound sensor devices that are observed during the time window; and generating and storing a sound localization model based on the sound sensor map, autonomous device location information, and the received sound data, the model being configured to compensate for how sounds travels among rooms in at least a portion of the building such that an origin room of a sound source is identifiable.

23 Claims, 8 Drawing Sheets

DRONE ASSISTED SETUP FOR BUILDING SPECIFIC SOUND LOCALIZATION MODEL

CROSS REFERENCE TO RELATED APPLICATIONS

This disclosure claims the benefit of the priority of U.S. Provisional Application Ser. No. 63/035,343, entitled "DRONE ASSISTED SETUP FOR BUILDING SPECIFIC SOUND LOCALIZATION MODEL" and filed Jun. 5, 2020, which is incorporated herein by reference in its entirety.

TECHNICAL FIELD

This disclosure relates to systems such as alarm systems and home automation systems.

BACKGROUND

Systems such as alarm systems and home automation systems can trigger various types of events based on sensor input. For example, a door sensor can produce a door opening event, and if the alarm system is armed, the door opening event can trigger an alarm. A motion sensor can produce a motion event, and if the alarm system is armed, the motion event can trigger an alarm. Some systems can use sound to trigger events including alarm events or home automation action.

SUMMARY

A network of sound sensor devices can be placed in and around a building, such as a store, warehouse, mall, school, or a house, to pinpoint the location of a sound and trigger appropriate actions such as sending a notification that an unexpected sound was heard, e.g., party noise during quiet hours, an alarm event, e.g., glass break was heard by a sensor located in the master bedroom, or an automation event, e.g., turn on lights in a room when the system hears voices in that room. A sound localization model can assist a system to pinpoint sounds within or around a building and to differentiate between sounds that should trigger an action and sounds that should not trigger any actions. This disclosure provides techniques and systems for generating and using sound localization models.

Sound may travel within a building due to conduits such as air vents, ducts, and pipes, differences in wall thickness, and acoustic properties of each room. A bedroom, for example, can have a vent that is also connected to a vent a kitchen via an air duct. A sound produced in the kitchen can travel to the bedroom. A sound sensor device in the bedroom can detect the kitchen sound, which may result in a system such as an alarm system or a home automation system triggering a rule associated with the detection of sound in the bedroom rather than or in addition to the kitchen. After training a sound localization model on locally collected sound data, the model can be used to localize sound to a particular room. Thus, in this case, when the system detects sounds in both the kitchen and the bedroom, the system can use the sound localization model to determine whether the sound originated in the bedroom or the kitchen, and then perform an action associated with the room where the sound originated and avoid performing an action in the other room.

Using a device such as a drone, robot, or other device that can be precisely localized within a building and using a network of sound sensor devices throughout the building, a system can build a sound localization model that allows the system to extrapolate the likely volume and location of sounds within a space. The system can build a model of how various sound sensors in a building such as a warehouse or a residential house hear sounds coming from different areas of the house or warehouse by having a drone or other robotic device work with those sensors to create a model that can be used for localizing sounds.

During a model configuration process, the drone can report to the system what sounds it is making and where it is in the building. The system can combine the drone's reported data with what was being recorded by the sound sensors, e.g., amplitudes of sounds received at various sound sensors to build a model of what different types of sounds look like to those sensors. In some implementations, the system can use machine learning or one or more statistical techniques to build the model.

A device such as a smartphone or other mobile device can also work with sensors to create a model that can be used for localizing sounds. For example, a user can move the smartphone to various places within the building where the smartphone will emit sounds for detection by the sensors. The smartphone can be configured to report its location and information about the sounds it is generating to the system building the model. The system can combine the smartphone's reported data with what was being recorded by the sound sensors, e.g., amplitudes of sounds received at various sound sensors to build a model of what different types of sounds look like to those sensors.

According to an aspect of the present disclosure, a technique for generating a sound localization model can include obtaining, by a controller, a sound sensor map of a building, the sound sensor map indicating locations of one or more first sound sensor devices in a first room of the building and one or more second sound sensor devices in a second room of the building; causing, by the controller, an autonomous device to navigate to the first room and to emit, during a time window, one or more sound patterns at one or more frequencies within the first room; receiving, by the controller, autonomous device location information that indicates a location of the autonomous device during the time window; receiving, by the controller, sound data including first sound data associated with sounds sensed by the one or more first sound sensor devices during the time window and second sound data associated with sounds sensed by the one or more second sound sensor devices during the time window; generating, by the controller, a sound localization model based on the sound sensor map, the autonomous device location information, and the received sound data; and storing, in a memory by the controller, a representation of the sound localization model. The sound localization model can be configured to compensate for how sounds travels among rooms in at least a portion of the building such that an origin room of a sound source is identifiable. Other implementations include corresponding systems, apparatus, and computer programs to perform the actions of methods defined by instructions encoded on computer readable storage.

These and other implementations can include one or more of the following features. The controller can be configured to transmit commands to the autonomous device to cause the device to perform operations. In some implementations, the autonomous device includes an aerial drone. Other types of devices are possible. Implementations can include obtaining layout information of the building; causing, by the controller, the autonomous device to navigate through the building to collect sensor device location information regarding locations of sensor devices including the one or more first sound sensor devices and the one or more second sound sensor devices; and generating the sound sensor map based on the sensor device location information. In some implementations, the controller can receive autonomous device location information that indicates a location of an autonomous device during a time window when the autonomous device emitted one or more sound patterns at one or more frequencies within the first room.

Implementations can include receiving third sound data from the one or more first sound sensor devices, the one or more second sound sensor devices, or one or more third sound sensor devices; detecting a sound based on the third sound data; and identifying a room of the building that corresponds to an origin of the sound based on the third sound data and the sound localization model. Implementations can include triggering a notification event based on the detected sound, the identified room, and one or more notification criteria. Identifying the room of the building that corresponds to the origin of the sound can include determining, based on the sound localization model and the third sound data, sound origin likelihoods for a plurality of rooms in the building including the first room and the second room; and selecting a room to identify as the origin of the sound based on the sound origin likelihoods.

Generating the sound localization model can include generating a first sound localization model for the first room based on the sound sensor map, the autonomous device location information, and the received sound data such that the first sound localization model is usable to produce a value corresponding to a likelihood of a sound originating within the first room based on third sound data. The third sound data can include data from the one or more first sound sensor devices, the one or more second sound sensor devices, or one or more third sound sensor devices. Generating the sound localization model can include generating a second sound localization model for the second room based on the sound sensor map, the autonomous device location information, and the received sound data such that the second sound localization model is usable to produce a value corresponding to a likelihood of a sound originating within the second room based on the third sound data.

Implementations can include receiving sound data from the one or more first sound sensor devices, the one or more second sound sensor devices, or one or more third sound sensor devices; detecting a sound based on the sound data; using the sound localization model to make a determination of whether the sound originate from inside the building or outside the building; and triggering a notification event based on the detected sound, the determination, and one or more notification criteria.

Particular configurations of the technology described in this disclosure can be implemented so as to realize one or more of the following potential advantages. Using an autonomous device can increase the efficiency of producing sound patterns and collecting sound data for generating a sound localization model by eliminating or reducing the need for human intervention. Using an autonomous device can increase the accuracy of a sound localization model by enabling the ability to readily collect more sound data. Using a sound localization model can increase the accuracy locating a true origin of a sound source, which can improve the accuracy of triggering notification events and can eliminate or reduce false notifications.

The details of one or more implementations are set forth in the accompanying drawings and the description below. Other features will be apparent from the description and drawings.

DETAILED DESCRIPTION

Figure 1:
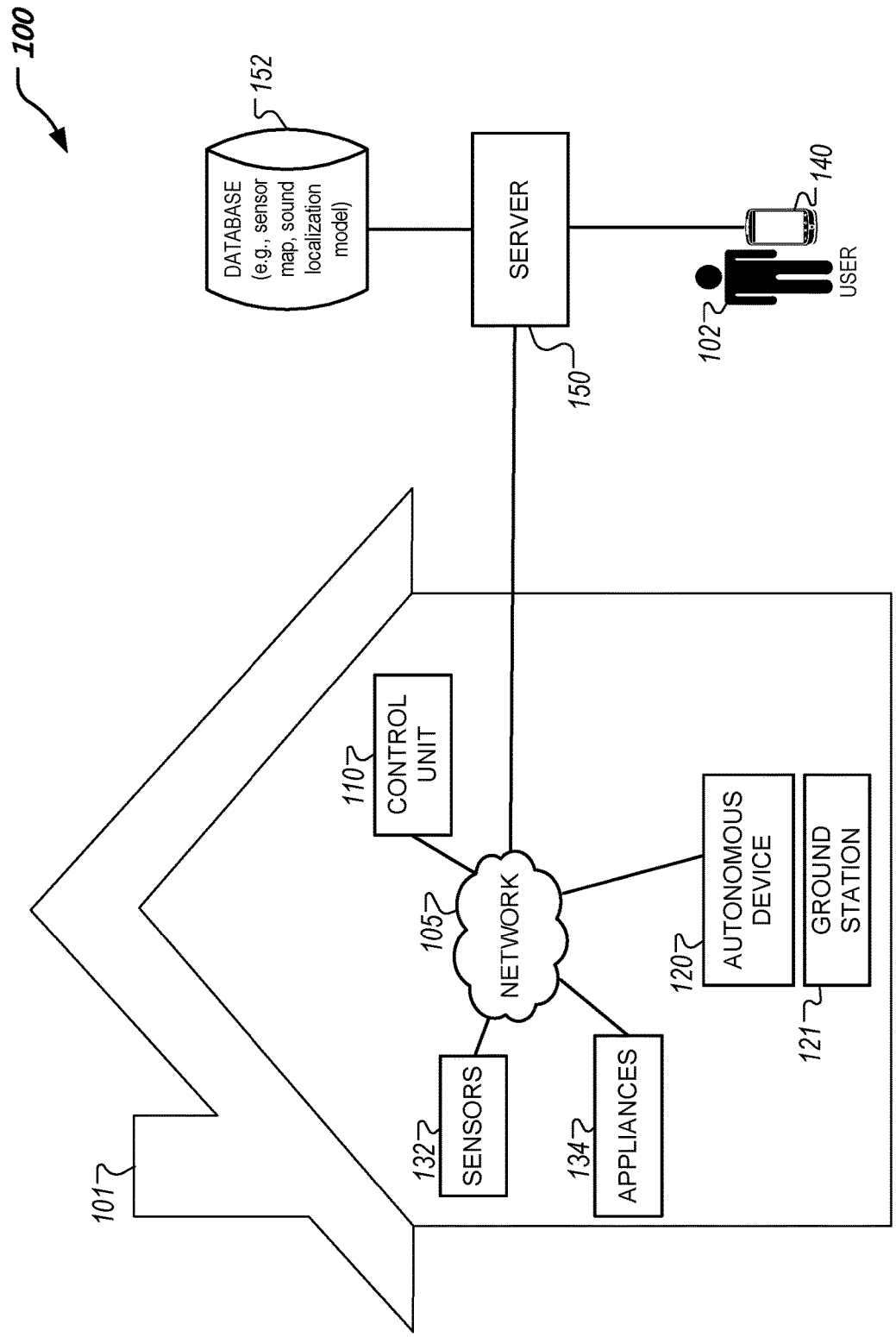
FIG. 1 illustrates an example of an electronic system that is capable of generating and using a sound localization model.

FIG. 1 illustrates an example of an electronic system 100 that is capable of generating and using a sound localization model. The electronic system 100 includes a control unit 110, an autonomous device 120, ground station 121, sensors 132 including sound based sensors, appliances 134, a user device 140, and a server 150 connected over a network 105 within a property 101. The user device 140 can be associated with a user 102 such as an individual that is authorized to access the property 101 and/or control monitoring operations of the system 100. The server 150 further includes a database 152 for storing information associated with sensors 132 that are located within the property 101. The database 152 can include information on where the sensors 132 are located, sensor calibration information, and one or more sound localization models associated with the property 101. In some implementations, the database 152 is stored locally on the control unit 110. In some implementations, the server 150 is provided via cloud based service.

The system 100 enables the user 102 to configure and adjust various types of monitoring operations that are associated with the property 101. As examples, the user 102 can use the system 100 to view and collect information captured by the sensors 132, track detected movement through the property premises, adjust a set point temperature for a connected thermostat, and/or enable or disable the operation of the appliances 134.

The sensors 132 can include a sound sensor, a contact sensor, a motion sensor, a glass break sensor, or any other type of sensor included in an alarm system or security system. The sensors 132 also can include an environmental sensor, such as a temperature sensor, a water sensor, a rain sensor, a wind sensor, a light sensor, a smoke detector, a carbon monoxide detector, an air quality sensor, etc. The sensors 132 further can include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 132 can include a radio-frequency identification (RFID) sensor that identifies a particular article that includes a pre-assigned RFID tag.

In some implementations, the sensors 132 can include one or more cameras. The cameras can be video/photographic cameras or other type of optical sensing devices configured to capture images. For instance, the cameras can be configured to capture images of an area within a building monitored by the control unit 110. The cameras can be configured to capture single, static images of the area and also video images of the area in which multiple images of the area are captured at a relatively high frequency (e.g., thirty images per second). The cameras can be controlled based on commands received from the control unit 110.

The user 102 can also use the system 100 to locally or remotely transmit instructions to the autonomous device 120 to perform a specified action such as sensor registration, emitting sounds to calibrate the sensors 132 that have sound detection capabilities, and surveillance. The user 102, for example, may use the system 100 to transmit an instruction to the autonomous device 120 to perform a surveillance operation of the premises of the property 101. In other examples, the user 102 may use the system 100 to monitor, track, and manage assets that are located within the property 101. In such examples, the autonomous device 120 may periodically navigate through the indoor environment of the property 101 and check the status of assets located within the property 101. The autonomous device 120 may also perform specified actions in response to detecting status changes of assets indicating security breaches and/or other problematic conditions.

The control unit 110 may store sensor data received from the system 100 and perform analysis of sensor data received from the system 100. Based on the analysis, the control unit 110 may communicate with, and control aspects of, the autonomous device 120, the sensors 132, the appliances 134, or the user device 140. In addition, the control unit 110 may store sound sensor map data (e.g., location of sensors 132), sound model data (e.g., based on sound data collected by the sound detection sensors 132), or both.

The autonomous device 120 can be any type of electronic device that is capable of moving and taking actions that assist in security monitoring. For example, the autonomous device 120 can be an unmanned device (e.g., a drone device), a robotic device, or any other type of device that is capable of moving throughout the property 101 based on automated control technology and/or user input control provided by a user. In some examples, the autonomous device 120 can fly, roll, walk, or otherwise move about the property 101.

In various implementations, the autonomous device 120 can be a helicopter type device (e.g., a quad copter), a rolling helicopter type device (e.g., a roller copter device that can fly and also roll along the grounds, walls, or ceiling), a land vehicle type device (e.g., automated cars that drive around a property), or a plane type device (e.g., unmanned aircraft). In some instances, the autonomous device 120 can be a robotic device that is intended for other purposes and associated with the system 100 for use in appropriate circumstances. For instance, a security drone can be associated with the system 100 as the autonomous device 120 and can be controlled to take action responsive to system events.

The autonomous device 120 can be configured to automatically navigate within the property 101. For instance, the autonomous device 120 can include sensors and control processors that guide movement of the autonomous device 120 within the property. The autonomous device 120 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The autonomous device 120 can include control processors that process output from the various sensors and control the autonomous device 120 to move along a navigational route that reaches the desired destination and avoids obstacles. In this regard, the control processors detect walls or other obstacles in the property and guide movement of the autonomous device 120 in a manner that avoids the walls and other obstacles.

In addition, the autonomous device 120 may store data that describes attributes of the property 101. For instance, the autonomous device 120 may store a floorplan and/or a three-dimensional model of the property 101 that enables the autonomous device 120 to navigate the property 101. During initial configuration, the autonomous device 120 may receive the data describing attributes of the property 101, determine a frame of reference to the data (e.g., a home or reference location in the property 101), and navigate the property 101 based on the frame of reference and the data describing attributes of the property 101.

The autonomous device 120 can include one or more speakers to emit sound to assist the control unit 110 in creating a sound localization model. In some implementations, the autonomous device 120 can be configured to emit predetermined sound patterns at various locations at the property 101 to provide a reference sound pattern for recording by the sensors 132 that have sound detection capabilities. In some implementations, the autonomous device 120 records its location by using sensors such as cameras and/or time-of-flight sensors. In some implementations, the autonomous device 120 records its location by using a GPS or other location tracking mechanism at the time that it emits a sound pattern. The autonomous device 120 can provide its location information to the control unit 110 to associate collected sound data with a particular room where the sound originated. In some implementations, the autonomous device 120 can provide its location information such that the control unit 110 can make adjustments to the collected sound data, e.g., normalize the collected data based on the distances between the autonomous device 120 and each respective sensor.

In some implementations, the autonomous device 120 can include data capture and recording devices. In these examples, the autonomous device 120 can include one or more cameras, one or more motion sensors, one or more microphones, one or more biometric data collection tools, one or more temperature sensors, one or more humidity sensors, one or more air flow sensors, and/or any other types of sensors that can be useful in capturing monitoring data related to the property and users in the property.

The autonomous device 120 can be associated with a ground station 121. The ground station 121 can be located at a predefined or reference location within a property. The autonomous device 120 can be configured to navigate to the ground station 121 after successfully performing a particular specified action. For instance, after completing the specified action upon instruction by the control unit 110, the autonomous device 120 can be configured to automatically fly to and land on the ground station 121. In this regard, the autonomous device 120 may automatically maintain a fully charged battery in a state in which the autonomous device 120 is ready for use by the system 100.

The ground station 121 can include a contact-based charging stations, wireless charging station, or a combination thereof. In some implementations, autonomous device 120 can be temporarily deployed at a site by a system installer to perform a configuration, and as such a ground station 121 may not be required at the site. For contact based charging stations, the autonomous device 120 may have readily accessible points of contact that the autonomous device 120 are capable of positioning and mating with a corresponding contact on the ground station 121. For instance, a helicopter type robotic device may have an electronic contact on a portion of its landing gear that rests on and mates with an electronic pad of a ground station 121 when the helicopter type robotic device lands on the ground station 121. The electronic contact on the robotic device can include a cover that opens to expose the electronic contact when the robotic device is charging and closes to cover and insulate the electronic contact when the robotic device is in operation.

For wireless charging stations, the autonomous device 120 may charge through a wireless exchange of power. In these cases, the autonomous device 120 need only locate themselves closely enough to the wireless charging stations for the wireless exchange of power to occur. In this regard, the positioning needed to land at a predefined home base or reference location in the property can be less precise than with a contact-based charging station. Based on the autonomous device 120 landing at a wireless charging station, the wireless charging station outputs a wireless signal that the autonomous device 120 receive and convert to a power signal that charges a battery maintained on the autonomous device 120.

The autonomous device 120 may exchange communications with the control unit 110, the sensors 132, the appliances 134, the user device 140, and the server 150 over the network 105 or any other suitable communication means. For example, the autonomous device 120 may utilize a wireless data pathway configured to transmit signals from the control unit 110, the sensors 132, the appliances 134, the user device 140, and the server 150 to a controller. The control unit 110, the sensors 132, the appliances 134, the user device 140, and the server 150 may continuously transmit sensed values to the controller, periodically transmit sensed values to the autonomous device 120, or transmit sensed values to the autonomous device 120 in response to a change in a sensed value.

The appliances 134 can include one or more home automation devices connected to the network 105 that are configured to exchange electronic communications with other devices of the system 100. The appliances 134 can include, for example, connected kitchen appliances, controllable light sources, safety and security devices, energy management devices, and/or other types of electronic devices capable of exchanging electronic communications over the network 105. In some instances, the appliances 134 may periodically transmit information and/or generated data to the control unit 110 such that the control unit 110 can automatically control the operation of the appliances 134 based on the exchanged communications. For example, the control unit 110 may operate one or more of the appliances 134 based on a fixed schedule specified by the user. In another example, the control unit 110 may enable or disable one or more of the appliances 134 based on received sensor data from the sensors 132. In some implementations, the control unit 110 uses sound-based rules to control one or more of the appliances 134. In some implementations, the control unit 110 uses a sound localization model to filter sound data from one or more sensors 132 before performing a sound-based rule.

The user device 140 can include an application that enables communications with the system 100, including devices located within the property 101, through the server 150. For instance, the user device 140 may load or install the application based on data received over a network 105 or data received from local media. The application may run on various mobile device platforms associated with the user device 140. The user device 140 can be any type of personal electronic computing device that is associated with users that reside within the property 101 (e.g., a tenant, temporary visitor, guest, etc.). Examples of user device 140 include a cellular telephone, smartphone, a tablet-computing device, a laptop computing device, a desktop computing device, a wearable device, or any other type of network-enabled electronic device. Other types of user devices are possible.

In some implementations, the application of the user device 140 can be used to start a sensor mapping process and sound model generation process. In some implementations, the user device 140 can emit one or more sound patterns for detection by one or more of the sensors 132 such that the system 100 can generate at least part of a sound localization model. The user device 140 can report a device location and time of when the device 140 emitted a sound pattern.

The server 150 can be an electronic device configured to provide monitoring services by exchanging electronic communications with the control unit 110, the autonomous device 120, the sensors 132, the appliances 134, and the user device 140 over the network 105. In some implementations, the server 150 can be configured to monitor events (e.g., alarm events, emergency conditions, etc.) generated by the control unit 110, the autonomous device 120, or both. For example, the server 150 may exchange electronic communications with a network module included in the control unit 110 to receive information regarding events (e.g., sound, fire, carbon monoxide, etc.) detected by the control unit 110. The server 150 also may receive information regarding events (e.g., alarm events) from the autonomous device 120.

The server 150 may store sensor data received from the system 100 and perform analysis of sensor data received from the system 100. Based on the analysis, the server 150 may communicate with and control aspects of the control unit 110, the autonomous device 120, or the user device 140. The server 150 may store information including sensor map data (e.g., location of sensors 132), one or more sound localization models (e.g., a model generated based on sound data collected by the sensors 132 that are capable of detecting sound), or both in a database 152.

A sound localization model can be used for one or more purposes. In some implementations, such a model after being trained on local sound data can provide a sound level baseline. For example, in a security system, loud sounds coming from an area that should be quiet according to the baseline can trigger the recording of an audio clip, a user notification, or an alarm event. A security system can use a sound localization model to differentiate between a sound originating indoors and a louder sound originating outside of a window. The model can help to differentiate between intruders/non-intruders and pests/non-pests. In a warehouse setting, a sound localization model can help to detect when inventory in a warehouse has become unstable and has started to fall. New sources of constant sound could be brought to the attention of a user such as a homeowner or business owner, allowing them to identify machinery that is reporting a problem, a leak in a pipe, or machinery that is jammed or failing, etc.

In some implementations, the sound localization model can be used to differentiate between expected and unexpected sounds. Further, a security system can be figured to send a camera drone to inspect unexpected sounds. In some implementations, a smart-home system can determine the location of residents within the home, for instance identifying the user with a camera and then tracking their location by following their sounds as they move through the house. Such location determination can enable the smart-home system to provide personalization in areas without other tracking methods such as cameras. In some implementations, this location determination can be used to identify when all individuals in the house have moved to bedrooms to enable nighttime routines.

Figure 2B:
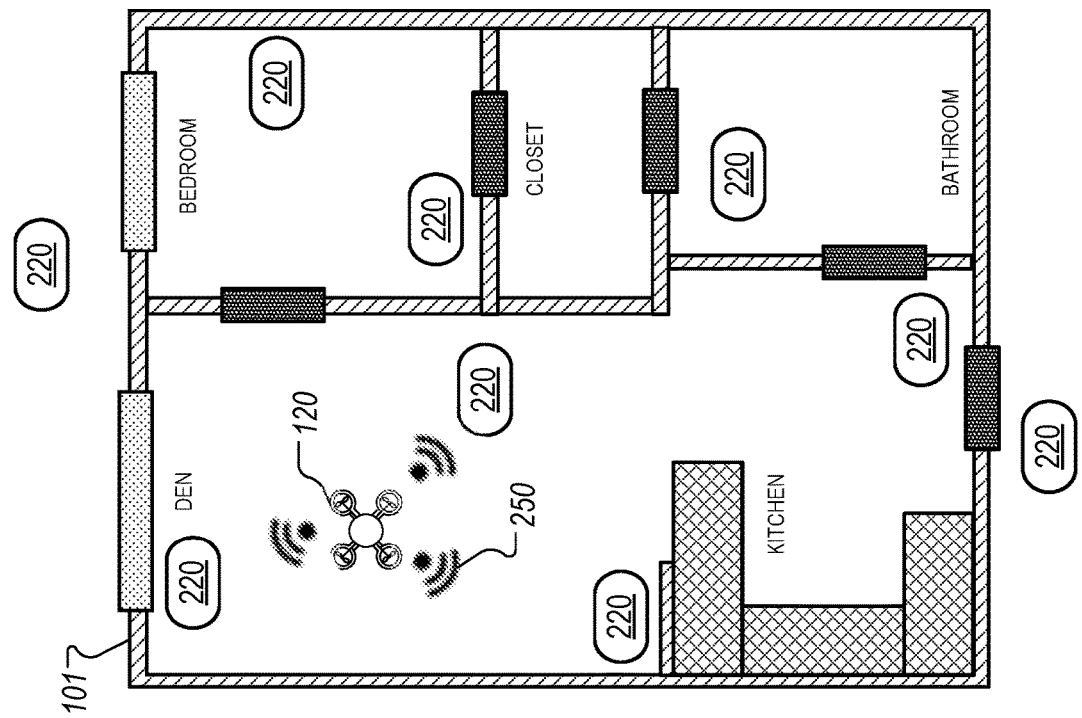
FIGS. 2A and 2B illustrate different aspects of a sensor mapping process and sound model generation process.
Figure 2A:
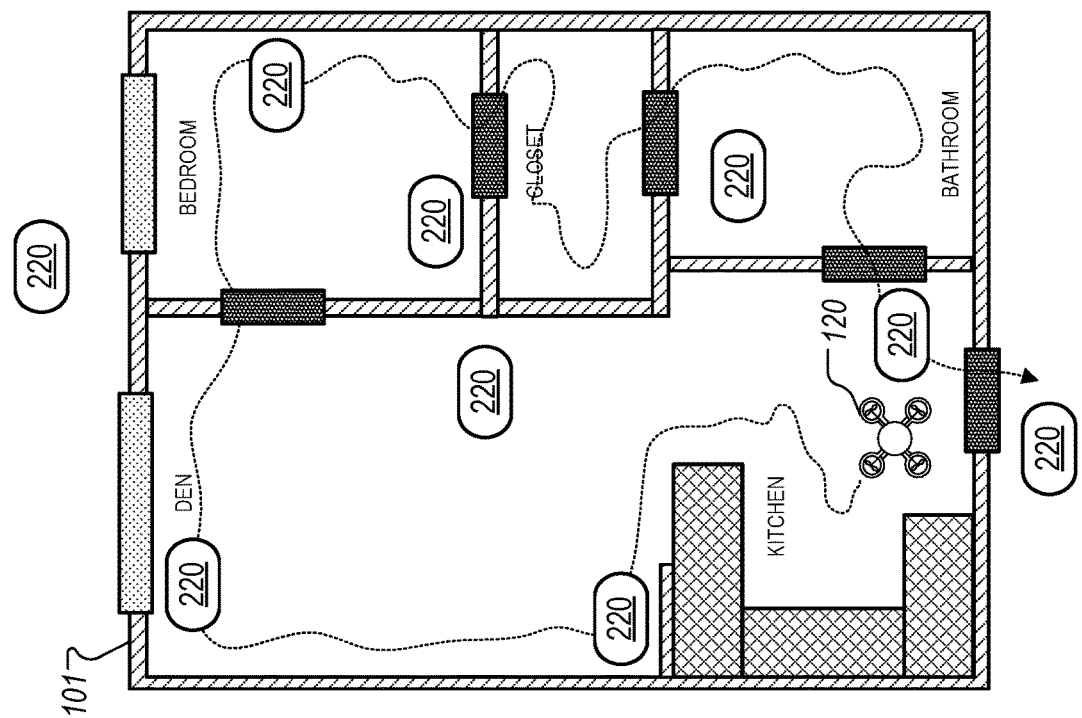

FIGS. 2A and 2B illustrate different aspects of a sensor mapping process and sound model generation process. FIG. 2A illustrates an example of a sensor mapping process to generate a map of sound sensor devices 220 associated with a property, e.g., property 101 of FIG. 1. The sensor devices 220 can be located indoors and outdoors. The sound sensor devices 220, which can be used to determine the location and amplitude of a sound source, can include a communications module for communicating with a computational hub of the system 100 (e.g., control unit 110, server 150, or both) and one or more microphones for recording sound and reporting what it "hears" to the system. In some implementations, the sound sensor devices 220 can be placed throughout a building as well as around the exterior. In some implementations, a higher density of devices can provide better localization of sounds. In some implementations, the devices 220 can be incorporated into a larger device or part of the building, such as a light fixture, power outlet, or light switch. Microphones in devices such as voice assistants or security cameras can be utilized as sound sensor devices 220. In some implementations, the sound sensor devices 220 can transmit an audio clip when an input amplitude exceeds a predetermined threshold. In some implementations, the predetermined threshold can be specified in decibels. In some implementations, the devices 220 can perform a minimal amount of audio processing before sending its audio stream to the control unit 110. For example, a sound sensor device 220 can perform compression, separate out the frequencies and amplitudes that it is recording, or both.

A configuration device such as an autonomous device 120 can generate a map of sound sensor devices 220 associated with the property 101. In this example, the autonomous device 120 is an aerial drone, which can be referred to as an unmanned aerial vehicle (UAV). Other types of configuration devices are possible such as a handheld device, e.g., smartphone. In some implementations, the autonomous device 120 is configured to physically map the space through a technology such as simultaneous localization and mapping (SLAM).

The autonomous device 120 performs a registration of the property 101 to locate, map, and register each sensor device 220. The autonomous device 120 maps the indoor and outdoor environments of the property 101, including where the sound sensor devices 220 are located. Further, the autonomous device 120 may navigate through the environment of the property 101 to identify boundaries such as walls, the ceiling, or openings. In some implementations, the autonomous device 120 may perform the registration using a two-dimensional or three-dimensional floorplan associated with the property 101.

In some implementations, the sound sensor devices 220 include a means by which the autonomous device 120 can identify each of the devices. For example, the sound sensor devices 220 can include a fiducial mark such as an external marking, e.g., QR code providing a device serial number, or can include a transponder configured to emit a device serial number. The autonomous device 120 can detect the mark or a transponder signal to identify the device, determine a position of the device, and create a record containing a device identifier and a device position.

FIG. 2B illustrates an example of a technique to generate a sound localization model based on data collected from sound sensor devices 220 associated with the property 101 in response to sound patterns emitted by the autonomous device 120. The technique includes a configuration process to obtain sound data and a model process to generate a sound localization model from the sound data. During configuration, the autonomous device 120 and the sound sensor devices 220 can be in communication with a configuration process running on equipment such as a control unit 110, server 150, or a combination of different equipment. The sound sensor devices 220 can provide information, e.g., audio clip, on the sounds detected to the configuration process. The autonomous device 120 can provide information about its location and the timestamp of when it emitted a particular sound to the configuration process. In some implementations, the sounds emitted by the device 120 can include a predetermined sound pattern. In some implementations, the sounds emitted by the device 120 can include a noise sound pattern, e.g., noise within a predetermined frequency range for a predetermined duration.

The autonomous device 120 can move throughout the property 101 making a variety of sounds 250 through one or more attached speakers. In some implementations, because higher and lower frequencies of noise move differently through different materials or are reflected differently (e.g., certain frequencies may reflect off a rug differently than off a smooth metal surface), the autonomous device 120 can make a variety of noises at various volumes at every location while providing precise details about the noises being made and the device's 220 current location. This can enable the model generation process to build a model, e.g., a sound localization model, of what different sensor devices 220 hear related to the frequency and location of the sound 250. A system equipped with a sound model, for example, can accept inputs of audio data captured at one or more points in time and space and can output a location and strength for the source. Once the model generation process has generated an initial model, the process can extrapolate based on the frequency and amplitude of sound heard from different microphones to produce a revised sound localization model. For example, extrapolation can be used to expand the model to cover frequencies that were not explicitly tested. Further, extrapolation can be used to expand the model to cover areas in a room that were not explicitly tested. In some implementations, an interface can be provided to a user to allow the user to change the model and correct anomalies in the model data. The autonomous device 120 can traverse the outside area of the property 101 to provide the ability to localize exterior sounds.

In a residential home, each room selected for monitoring can include one or more sound sensor devices. In some implementations, multiple devices, e.g., three, can be installed in a room to triangulate the source of a sound. In some implementations, multiple devices, e.g., two, three, or four devices, are installed on the exterior of the house to differentiate between loud external sounds and quieter internal ones. The sound sensor devices and one or more sound localization models can be used to detect various things such as excessive levels of noise, for instance a rental property being used for a party; location of loud noises in the night, if, for instance, something fell; the location of people moving through the house to help determine occupancy for automation or to report on the last locations of individuals in the house to first responders in case of an emergency such as a fire or gas leak; the presence and/or location of pests such as crickets; sounds inside the house when the house is supposed to be empty; and leaks.

In a warehouse or other types of industrial buildings, sound sensor devices can be deployed at one or more intervals, e.g., every six to ten feet, around the perimeter of the building with several devices placed in the middle in areas to achieve a distribution of devices throughout the building. In such buildings, the devices can be used to detect people or pests moving around when the building is supposed to be empty, shifts in merchandise that could represent dangerously unstable stacks, leak in a pipe or other source of water that could cause serious damage to machinery or inventory, or machines that are either emitting a warning tone or making unusual noises due to being jammed or in the process of breaking down.

A system of sound sensor devices can be configured to cover larger areas, such as a school, park, or mall. The system can be used to generate analytics on the general movement of crowds, identify unexpected increases in volume in a specific area indicating, for instance, that a fight has broken out, or provide police information on the location of gunshots in an active shooter situation.

Figure 3:
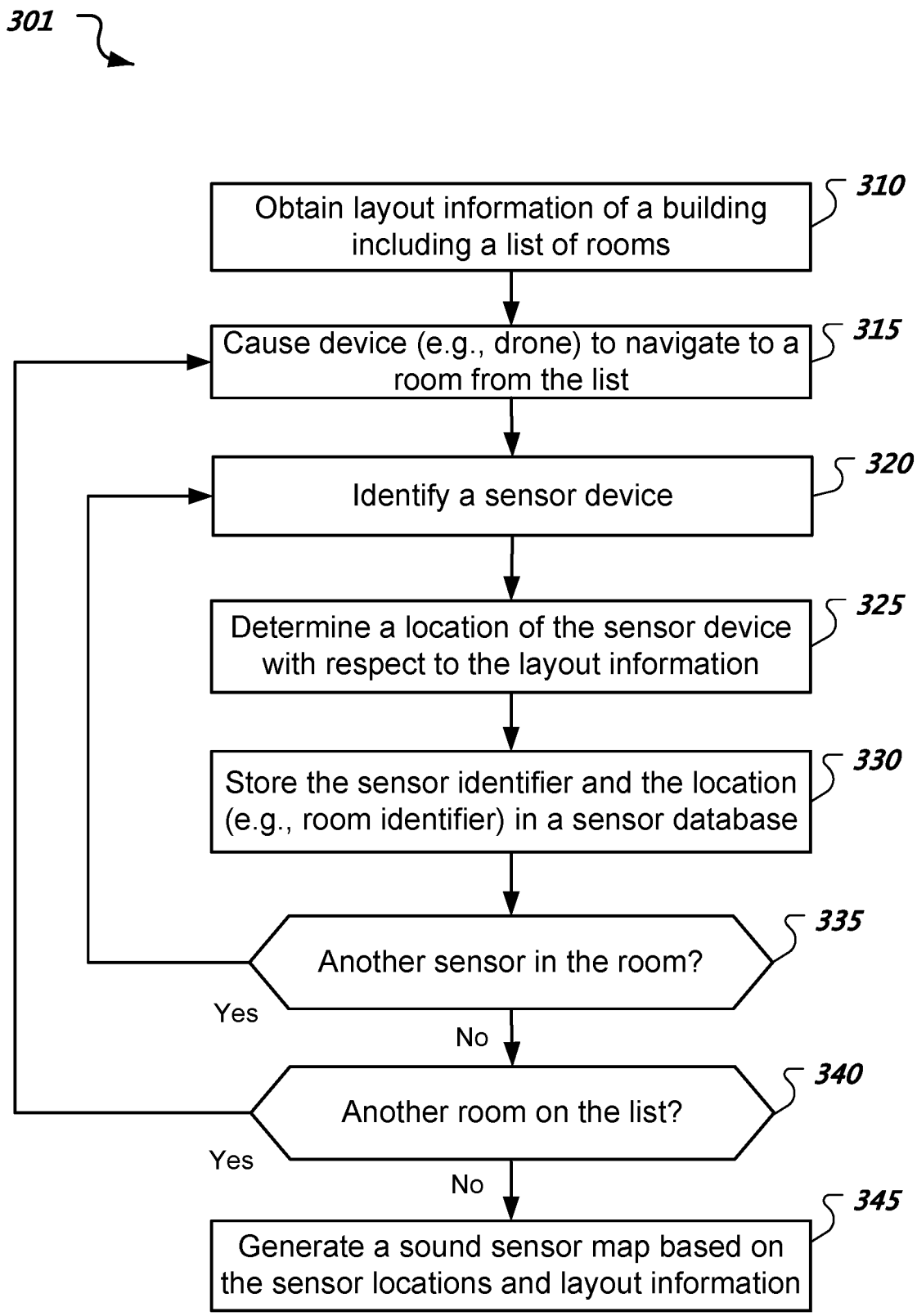
FIG. 3 shows a flowchart of a sensor mapping process for sound sensor devices.

FIG. 3 shows a flowchart of a sensor mapping process 301 for sound sensor devices. The sensor mapping process 301 can be performed at least in part by a control unit, e.g., control unit 110 of FIG. 1 or control unit 810 of FIG. 8, a server, e.g., server 150 of FIG. 1 or servers 860, 870 of FIG. 8, controller 605 of FIG. 6, and/or an autonomous device. At 310, the control unit obtains layout information of a building including a list of rooms. Layout information can include architectural diagrams, floor plans, room names, room boundaries, etc. In some implementations, each room can be associated with a room identifier. In some implementations, layout information can be obtained via an imaging platform that takes images of each room in a building.

At 315, the control unit causes an autonomous device to navigate to a room from the list. In some implementations, the autonomous device can obtain layout information as it navigates the building, exploring each room until it determines that there are no more rooms to explore. In some implementations, causing the autonomous device to navigate can include sending a launch command to the autonomous device to trigger a local sensor mapping routine on the autonomous device.

At 320, the control unit identifies a sound sensor device. Identifying a sound sensor device can include operating the autonomous device to identify a sound sensor device. In some implementations, the autonomous device can use a camera to optically scan the room for sensor devices and detect a device based on a visual marker on the device. In some implementations, the autonomous device can use a wireless receiver, e.g., Wi-Fi or Bluetooth, to scan the room for sensor devices and detect a device based on a signal transmitted by the device.

At 325, the control unit determines a location of the sound sensor device with respect to the layout information. In some implementations, the control unit uses a SLAM technique to determine a location. Sensor location information can include a room identifier. In some implementations, sensor location information includes two-dimensional or three-dimensional coordinates. In some implementations, sensor location information includes a vertical displacement value, e.g., height from the floor if mounted on a wall. At 330, the control unit stores the sensor identifier and the sensor location in a database.

At 335, the control unit determines whether there is another sensor device in the room. If there is, the control unit continues at 320. If there are no more sensor devices in the room, the control unit continues at 340. At 340, the control unit determines if there is another room in the building to map. If there is, the control unit continues at 315. If there are no more rooms, the control unit continues at 345. At 345, the control unit generates a sound sensor map based on the sensor locations and layout information.

In some implementations, the control unit can obtain information such as layout information and a list of sound sensor devices by querying a user via a user interface to input each sensor, accessing a sensor database, or both. In some implementations, the control unit can broadcast a signal to cause sound sensor devices to register with the control unit. In some implementations, a sound sensor device registers with the control unit upon power-up. After registering with the control unit, the control unit can insert a sensor identifier into a sensor database. Based on the sensor identifiers in the database, the control unit can cause the autonomous device to locate each corresponding sensor and obtain information to determine respective sensor locations.

Figure 4:
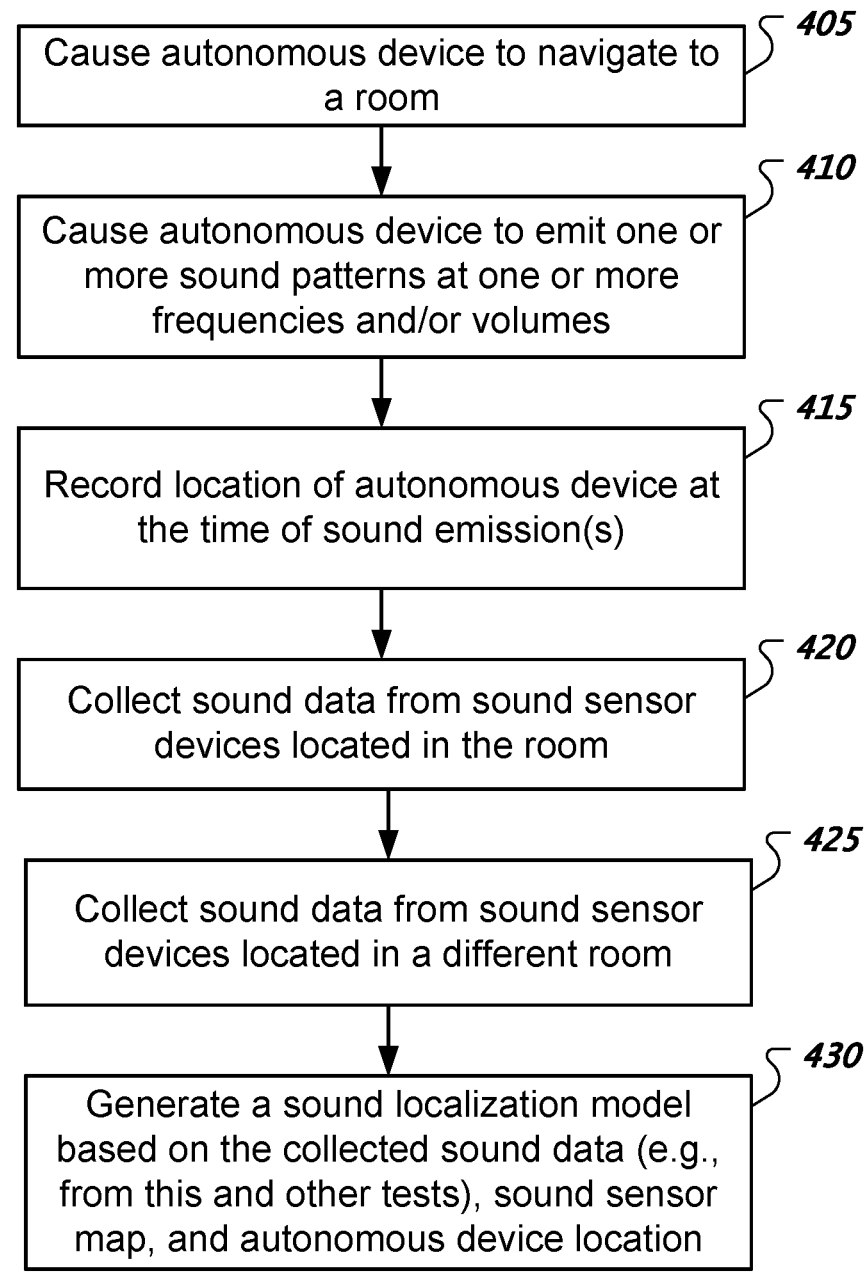
FIG. 4 shows a flowchart of a sound model generation process.

FIG. 4 shows a flowchart of a sound model generation process 401. The sound model generation process 401 can be performed at least in part by a controller or control unit, e.g., control unit 110 of FIG. 1 or control unit 810 of FIG. 8, a server, e.g., server 150 of FIG. 1 or servers 860, 870 of FIG. 8, an autonomous device, controller 605 of FIG. 6, or a combination thereof. At 405, the control unit causes an autonomous device to navigate to a room of a building. In some implementations, the control unit sends a command to active a navigation process in the autonomous device. In some implementations, the control unit generates a list of rooms, selects a room from the list, and causes the autonomous device to navigate to the selected room. At 410, the control unit causes the autonomous device to emit one or more sound patterns at one or more frequencies and/or volumes in the room. In some implementations, the control unit sends a command to active a sounding process in the autonomous device. In some implementations, the sounding process includes one or more preprogrammed sound patterns. In some implementations, one or more sound patterns can mimic real events, such as a pre-recorded audio message, dishwater noise, washer machine noise, etc. Other types of sound patterns are possible.

At 415, the control unit records a location of the autonomous device at the time of sound emission(s). In some implementations, the control unit creates test records in a database indicating the timestamp, autonomous device location, and the emitted sound pattern. At 420, the control unit collects sound data from sound sensor devices located in the room. At 425, the control unit collects sound data from sound sensor devices located in a different room(s). In some implementations, the process 401 can include determining whether sound sensor devices in a different room also detected the sound emissions associated with step 410. For example, a heating vent may conduct sound well to a different room, which may cause a false sound source detection. A sound location model can be generated that would compensate for how sounds travel to different rooms such that the true room for a sound source can be identified.

At 430, the control unit generates a sound localization model based on the collected sound data (e.g., from this and other tests), sound sensor map, and autonomous device position. The sound model generation process 401 can be configured to take into account how different frequencies of sound move differently through the various materials the building is made of, how sound may reflect differently from different objects, and how sound travels through ducts and other building features. In some implementations, the process 401 can correlate the sound sensor data, e.g., audio clips, with the test records to determine what audio clips where generated in response to a specific test. The process 401 can use a sound sensor map to position the autonomous device in a centralized location with respect to the sound sensors in the room. In some implementations, the test's sound volume setting, sound sensor map, and the autonomous device location information can be used by the process 401 to determine how a test sound should be perceived by a sound sensor.

In some implementations, the process 401 uses one or more machine learning techniques or one or more statistical techniques to build the model. In some implementations, the process 401 sends information including the sensor map, collected sound data, etc., to a cloud server and causes the cloud server to perform model training. Once the training has completed, the final model can be downloaded to a local computation hub, such as a control unit, to be run constantly on the data recorded by the sound sensor devices. In some implementations, the training and the run-time computation can be handled on a local device.

In some implementations, the process 401 uses a default sound model and revises the model based on data collected from the sensors. In some implementations, the default sound model provides information on how sound travels through hard-to-access spaces such as attics or crawl-ways. In some implementations, the default sound model provides information on sounds associated with weather events such as rain or wind.

In some implementations, one or more steps of the process 401 can be repeated (e.g., steps 405, 410, 415, 420, and 425) for each room in a house, office building, or warehouse. In some implementations, a warehouse can be divided into different sections which can be considered different "rooms" of the warehouse. In some implementations, the process 401 can be performed in one or more outside areas that surround the house, office building, or warehouse.

In some implementations, the process 401 can generate a model for each room or section in the building, where the model outputs a likelihood that a sound originated in the room or section. After sound is detected, a system can input the sound to each of the generated models and then select the room or section that has the highest likelihood output by any of the models. In some implementations, a model can localize a sound to a particular area of a room.

A system such as an alarm system or an automation system can use a sound localization model to process sound data to produce events, e.g., alarm event based on detecting an unexpected sound in a room, an automation event based on detecting sound in a room, or both. The system can augment, verify, or suppress event outputs from a process using a sound localization model with data from other sensors such as video, motion, or heat. In some implementations, additional sensor data can help to localize a sound or avoid false alarms. For example, a sound-based trigger event can be suppressed based on information from another sensor indicating that a family pet was responsible for the sound, e.g., family dog breaking a glass vase. In some implementations, an event is triggered if there is a sound-based trigger event and a motion event occurring in the same room and in the same time window. In some implementations, the model can be used to localize people to a particular area of a room, and if the area is off limits, the system can record the time and area for future analysis or the system can trigger an alarm.

Figure 5:
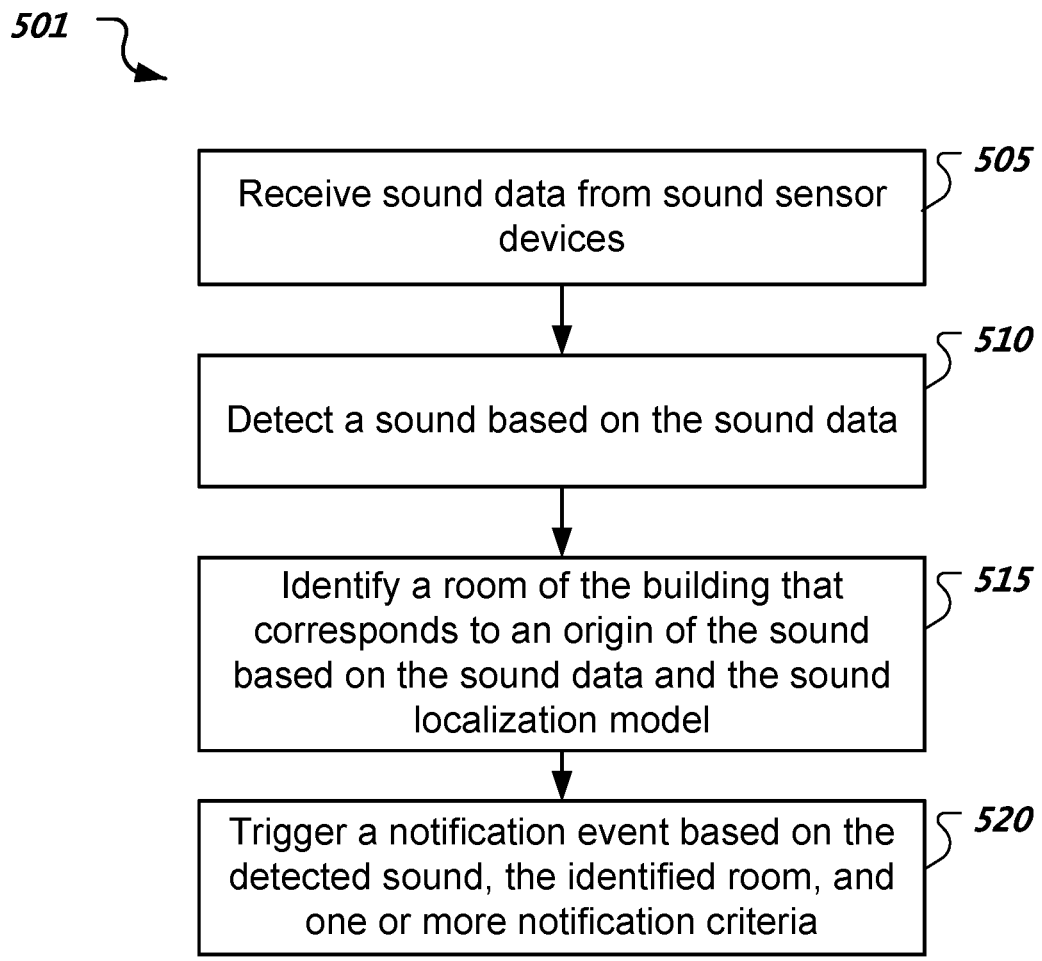
FIG. 5 shows a flowchart of a detect and notification process that uses a sound localization model.

FIG. 5 shows a flowchart of a detect and notification process that uses a sound localization model. The sound model generation process 501 can be performed at least in part by a controller or control unit, e.g., control unit 110 of FIG. 1 or control unit 810 of FIG. 8, a server, e.g., server 150 of FIG. 1 or servers 860, 870 of FIG. 8, an autonomous device, controller 605 of FIG. 6, or a combination thereof. At 505, the control unit receives sound data from sound sensor devices. Receiving sound data can include receiving one or more sensor measurements. At 510, the control unit detects a sound based on the sound data. In some implementations, detecting a sound includes determining whether a received sensor measurement exceeds a predetermine threshold. In some implementations, detecting a sound includes filtering an observed sound pattern within the measurements, e.g., filtering the sound of a washer or other appliance while its operating.

At 515, the control unit identifies a room of the building that corresponds to an origin of the sound based on the sound data and a sound localization model. In some implementations, identifying the room of the building that corresponds to the origin of the sound includes determining, based on the sound localization model and the sound data, sound origin likelihoods for a plurality of rooms in the building; and selecting a room to identify as the origin of the sound based on the sound origin likelihoods, e.g., selecting a room with the highest probability. In some implementations, the control unit can use the sound localization model to make a determination of whether the sound originate from inside the building or outside the building.

At 520, the control unit triggers a notification event based on the detected sound, the identified room, and one or more notification criteria. In some implementations, a notification criterion specifies an action for a specific a room in the building, and if sound is determined to have originated from that room, a notification event is triggered. In some implementations, a notification event includes or causes an alarm event. In some implementations, a notification criterion excludes one or more rooms in the building such that if sound is determined to have original from one of those rooms, a notification event is not triggered. In some implementations, the control unit can trigger or not trigger a notification event based on a determination of whether the sound originate from inside the building or outside the building. For example, a noise sensed inside the building but originated from outside of the building can be excluded from causing a notification event, or vice-versa.

Figure 6:
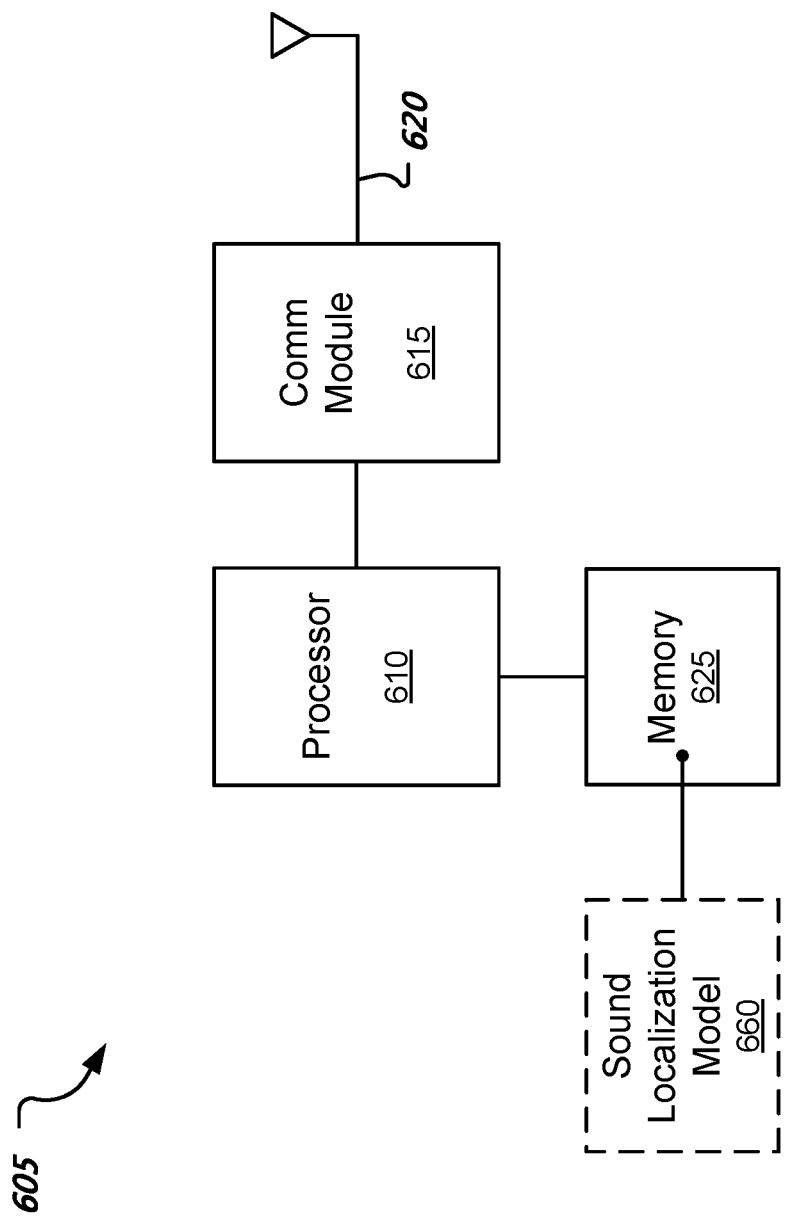
FIG. 6 shows a block diagram of an example of a controller.

FIG. 6 shows a block diagram of an example of a controller 605. The controller 605 can implement methods effecting one or more techniques presented in this disclosure. The controller 605 includes a processor 610, memory 625, and a communication module 615. In some implementations, the processor 610 includes one or more processor cores. In some implementations, the memory 625 can include random access memory (RAM) and non-volatile memory such as flash memory or a solid state drive (SSD).

The controller can be configured to communicate with other devices such as an autonomous device or sound sensor devices via the communication module 615. The communication module 615 can be coupled with one or more antennas 620. In some implementations, the communication module 615 includes a transceiver to receive and transmit signals. In some implementations, the communication module 615 uses a short-range wireless technology such as IEEE 802.11, Bluetooth, or Z-Wave. In some implementations, the communication module 615 uses a long-range wireless technology such as LTE, GSM, or CDMA for communications. In some implementations, the communication module 615 uses a wireline technology such as Ethernet.

The memory 625 can store information such as data, instructions, or both. In some implementations, the memory 625 includes a computer-readable storage medium which includes at least one program for execution by one or more processors 610, the at least one program including instructions which, when executed by the at least one processor, cause the device to perform operations as described herein. For example, the memory 625 can store instructions to generate a sensor map, operate an autonomous device, and generate a sound localization model. In this example, the memory 625 can store a representation of one or more sound localization models 660, such as model parameters, data sets, etc. Model parameters can include weights produced by a machine learning algorithm such as an artificial neural network.

Figure 7:
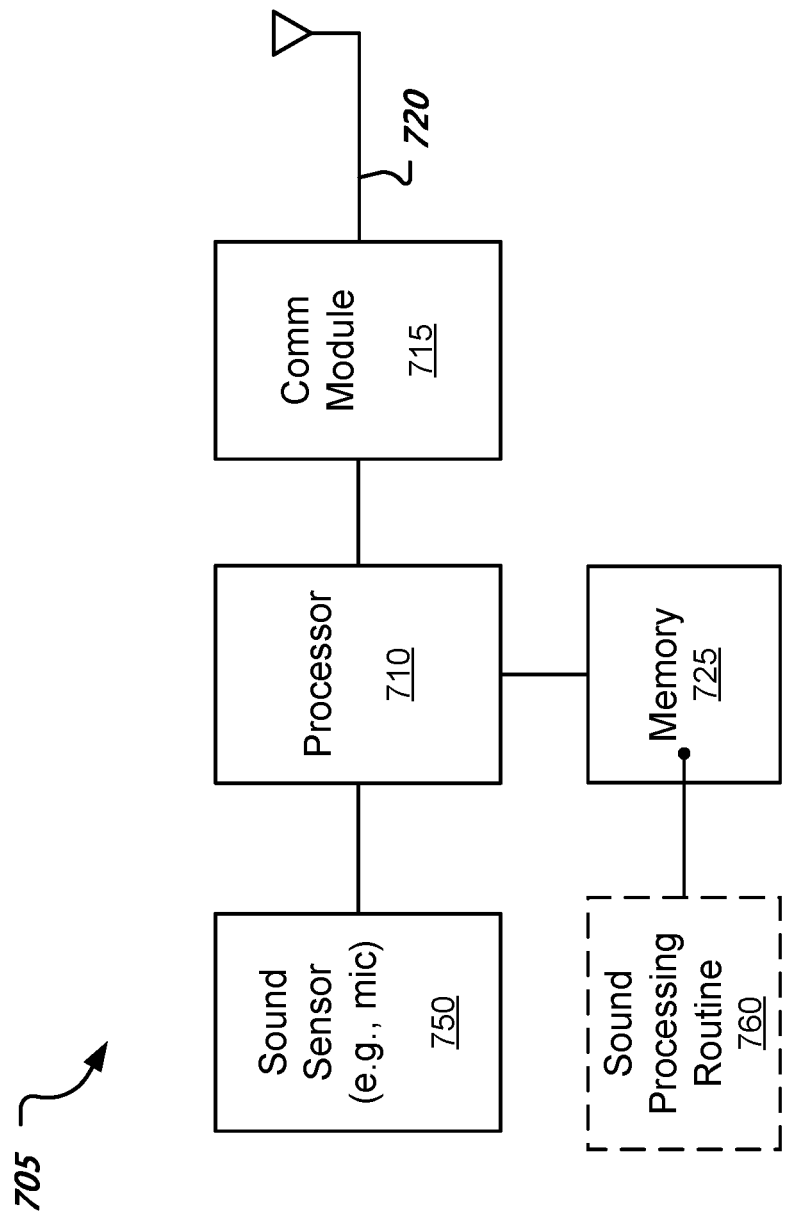
FIG. 7 shows a block diagram of an example of a sound sensor device.

FIG. 7 shows a block diagram of an example of a sound sensor device 705. The device 705 can implement methods effecting one or more techniques presented in this disclosure. The device 705 includes a sensor 750, processor 710, memory 725, and a communication module 715. In some implementations, the processor 710 includes one or more processor cores. In some implementations, the memory 725 can include RAM and non-volatile memory such as flash memory or a SSD.

The device 705 can be configured to detect sound input via a sensor 750 such as a microphone. In some implementations, the sensor 750 is configured to process sounds via various ranges such as infrasound, ultrasound, and human audible sound. In some implementations, the device 705 includes additional sensors such as video, heat, and motion. Other types of sensors are possible. The device 705 includes a communication module 715 to transmit and receive wireless signals. The communication module 715 is coupled with one or more antennas 720. In some implementations, the communication module 715 includes a transceiver to receive and transmit signals. In some implementations, the communication module 715 uses a short-range wireless technology such as IEEE 802.11, Bluetooth, or Z-Wave. In some implementations, the communication module 715 uses a long-range wireless technology such as LTE, GSM, or CDMA for communications. In some implementations, the communication module 715 uses a wireline technology such as Ethernet.

The memory 725 can store information such as data, instructions, or both. In some implementations, the memory 725 can store instructions to cause the processor 710 to generate data for transmission. In some implementations, the memory 725 can store instructions to cause the processor 710 to process data received via the communication module 715. In some implementations, the memory 725 can store instructions for a sound processing routine 760 that collects sound sensor data from sensor 750, generates sound notifications based on the sensor data, and transmits the sound notifications via the communication module 715. In some implementations, the device 705 can quantize sensor data and report a quantized sensor reading to a controller. In some implementations, the memory 725 can store instructions associated with a calibration process. In some implementations, the sound sensor device 705 can include a controller. In some implementations, a network of sound sensor devices 705 can select one of the sound sensor devices to be a control node for the network. In some implementations, the device 705 can communicate with other devices to triangulate an origin of a sound.

Figure 8:
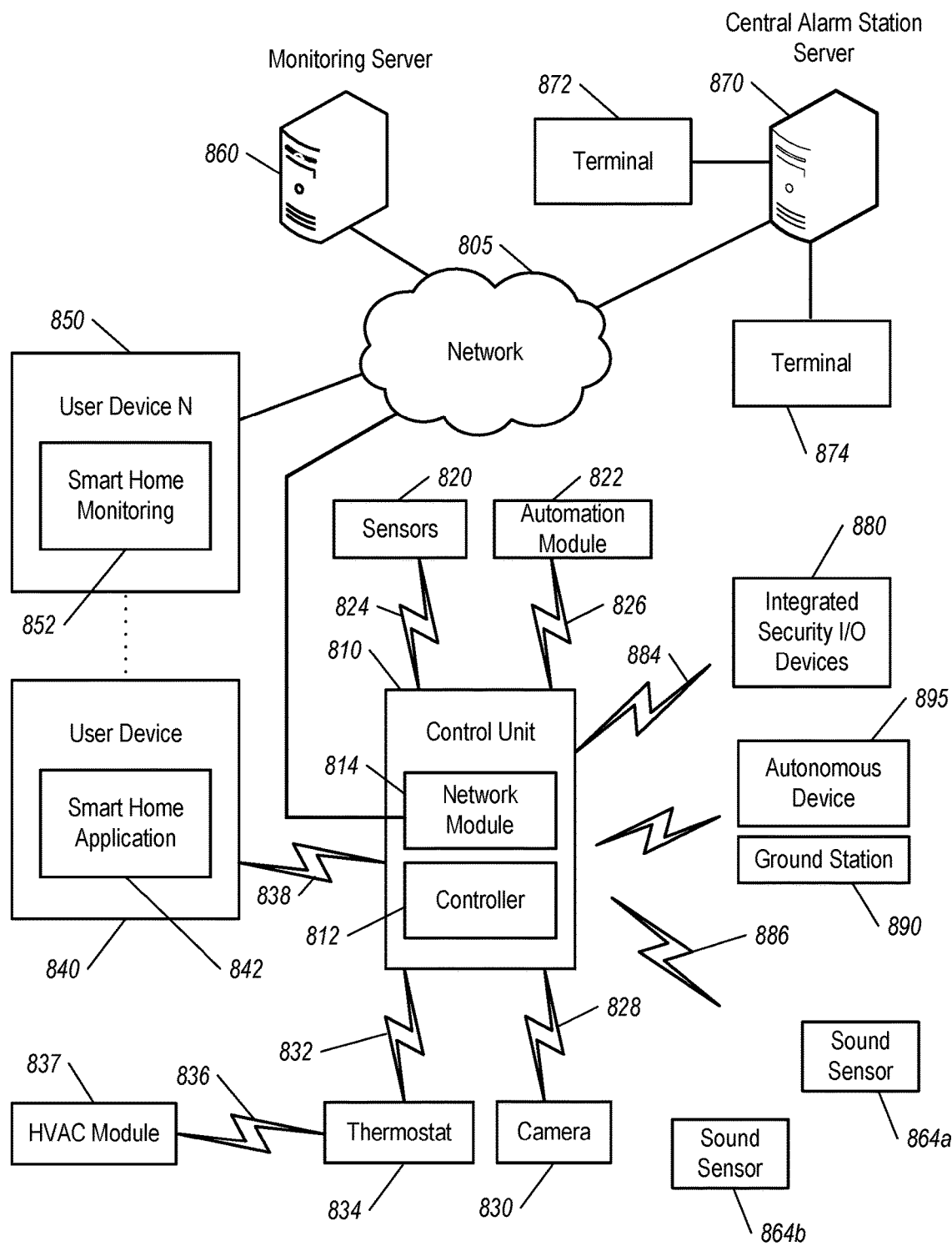
FIG. 8 shows a block diagram of an example security monitoring system.

FIG. 8 shows a block diagram of an example security monitoring system 800. The monitoring system 800 includes a network 805, a control unit 810, one or more user devices 840, 850, a monitoring server 860, and a central alarm station server 870. In some examples, the network 805 facilitates communications between the control unit 810, the one or more user devices 840, 850, the monitoring server 860, and the central alarm station server 870. This example further includes an autonomous device system that includes a ground station 890 and an autonomous device 895, such as an aerial drone. In some implementations, the control unit 810 can communicate with the ground station 890, the autonomous device 895, or both via a communication link to exchange sensor mapping and calibration information associated with the sound sensor devices 864a-b. In some implementations, the control unit 810 can cause the autonomous device 895 to launch in order to start a sound sensor mapping process, calibrating process, or both. In some implementations, the control unit 810 can be configured to perform a sound model generation process based on data received from the sound sensor devices 864a-b.

The network 805 is configured to enable exchange of electronic communications between devices connected to the network 805. For example, the network 805 can be configured to enable exchange of electronic communications between the control unit 810, the one or more user devices 840, 850, the monitoring server 860, and the central alarm station server 870. The network 805 can include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 805 can include multiple networks or subnetworks, each of which can include, for example, a wired or wireless data pathway. The network 805 can include a circuit-switched network, a packet-switched data network, or any other network able to carry electronic communications (e.g., data or voice communications). For example, the network 805 can include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 805 can include one or more networks that include wireless data channels and wireless voice channels. The network 805 can be a wireless network, a broadband network, or a combination of networks including a wireless network and a broadband network.

The control unit 810 includes a controller 812 and a network module 814. The controller 812 is configured to control a control unit monitoring system (e.g., a control unit system) that includes the control unit 810. In some examples, the controller 812 can include a processor or other control circuitry configured to execute instructions of a program that controls operation of a control unit system. In these examples, the controller 812 can be configured to receive input from sensors, flow meters, or other devices included in the control unit system and control operations of devices included in the household (e.g., speakers, lights, doors, etc.). For example, the controller 812 can be configured to control operation of the network module 814 included in the control unit 810.

The network module 814 is a communication device configured to exchange communications over the network 805. The network module 814 can be a wireless communication module configured to exchange wireless communications over the network 805. For example, the network module 814 can be a wireless communication device configured to exchange communications over a wireless data channel and a wireless voice channel. In this example, the network module 814 may transmit alarm data over a wireless data channel and establish a two-way voice communication session over a wireless voice channel. The wireless communication device can include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 814 also can be a wired communication module configured to exchange communications over the network 805 using a wired connection. For instance, the network module 814 can be a modem, a network interface card, or another type of network interface device. The network module 814 can be an Ethernet network card configured to enable the control unit 810 to communicate over a local area network and/or the Internet. The network module 814 also can be a voice band modem configured to enable the alarm panel to communicate over the telephone lines of Plain Old Telephone Systems (POTS).

The control unit system that includes the control unit 810 includes one or more sensors. For example, the monitoring system can include multiple sensors 820. The sensors 820 can include a lock sensor, a contact sensor, a motion sensor, or any other type of sensor included in a control unit system. The sensors 820 also can include an environmental sensor, such as a temperature sensor, a water sensor, a rain sensor, a wind sensor, a light sensor, a smoke detector, a carbon monoxide detector, an air quality sensor, etc. The sensors 820 further can include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 820 can include a RFID sensor that identifies a particular article that includes a pre-assigned RFID tag.

As shown in FIG. 8, the system 800 includes sound sensor devices 864a-b. The control unit 810 can communicate with one or more sound sensor devices 864a-b via wireless communication links 886. In some implementations, the control unit 810 performs a triangulation process based on sound notifications received from the sound sensor devices 864a-b. In some implementations, the control unit 810 can determine that someone entered a room based on inputs from one or more sound sensor devices 864a-b, and can instruct an HVAC module 837 to start cooling or heating a room. In some implementations, the control unit 810 forwards sound notifications to a server 860, 870 to perform a triangulation process based on the sound notifications. In some implementations, a server 860, 870 is configured to perform at least part of a sound sensor mapping processor, calibration process, and/or sound model generation process.

The control unit 810 communicates with an automation module 822 and the camera 830 to perform monitoring. The automation module 822 is connected to one or more devices that enable home automation control. For instance, the automation module 822 can be connected to one or more lighting systems and can be configured to control operation of the one or more lighting systems. The automation module 822 can be connected to one or more electronic locks at the property and can be configured to control operation of the one or more electronic locks (e.g., control Z-Wave locks using wireless communications in the Z-Wave protocol. Further, the automation module 822 can be connected to one or more appliances at the property and can be configured to control operation of the one or more appliances. The automation module 822 can include multiple modules that are each specific to the type of device being controlled in an automated manner. The automation module 822 may control the one or more devices based on commands received from the control unit 810. For instance, the automation module 822 may cause a lighting system to illuminate an area to provide a better image of the area when captured by a camera 830.

The camera 830 can be a video/photographic camera or other type of optical sensing device configured to capture images. For instance, the camera 830 can be configured to capture images of an area within a building or within a residential facility 102-A monitored by the control unit 810. The camera 830 can be configured to capture single, static images of the area and also video images of the area in which multiple images of the area are captured at a relatively high frequency (e.g., thirty images per second). The camera 830 can be controlled based on commands received from the control unit 810.

The camera 830 can be triggered by several different types of techniques. For instance, a Passive Infra-Red (PIR) motion sensor can be built into the camera 830 and used to trigger the camera 830 to capture one or more images when motion is detected. The camera 830 also can include a microwave motion sensor built into the camera and used to trigger the camera 830 to capture one or more images when motion is detected. The camera 830 may have a "normally open" or "normally closed" digital input that can trigger capture of one or more images when external sensors (e.g., the sensors 820, PIR, door/window, etc.) detect motion or other events. In some implementations, the camera 830 receives a command to capture an image when external devices detect motion or another potential alarm event. The camera 830 may receive the command from the controller 812 or directly from one of the sensors 820.

In some examples, the camera 830 triggers integrated or external illuminators (e.g., Infra-Red, Z-wave controlled "white" lights, lights controlled by the automation module 822, etc.) to improve image quality when the scene is dark. An integrated or separate light sensor can be used to determine if illumination is desired and may result in increased image quality.

The camera 830 can be programmed with any combination of time/day schedules, system "arming state," or other variables to determine whether images should be captured or not when triggers occur. The camera 830 may enter a low-power mode when not capturing images. In this case, the camera 830 may wake periodically to check for inbound messages from the controller 812. The camera 830 can be powered by internal, replaceable batteries if located remotely from the control unit 810. The camera 830 may employ a small solar cell to recharge the battery when light is available. Alternatively, the camera 830 can be powered by the controller's 812 power supply if the camera 830 is co-located with the controller 812.

The system 800 also includes thermostat 834 to perform dynamic environmental control at the property. The thermostat 834 is configured to monitor temperature and/or energy consumption of an HVAC system associated with the thermostat 834, and is further configured to provide control of environmental (e.g., temperature) settings. In some implementations, the thermostat 834 can additionally or alternatively receive data relating to activity at a property and/or environmental data at a property, e.g., at various locations indoors and outdoors at the property. The thermostat 834 can directly measure energy consumption of the HVAC system associated with the thermostat, or can estimate energy consumption of the HVAC system associated with the thermostat 834, for example, based on detected usage of one or more components of the HVAC system associated with the thermostat 834. The thermostat 834 can communicate temperature and/or energy monitoring information to or from the control unit 810 and can control the environmental (e.g., temperature) settings based on commands received from the control unit 810.

In some implementations, the thermostat 834 is a dynamically programmable thermostat and can be integrated with the control unit 810. For example, the dynamically programmable thermostat 834 can include the control unit 810, e.g., as an internal component to the dynamically programmable thermostat 834. In addition, the control unit 810 can be a gateway device that communicates with the dynamically programmable thermostat 834.

A HVAC module 837 is connected to one or more components of an HVAC system associated with a property, and is configured to control operation of the one or more components of the HVAC system. In some implementations, the HVAC module 837 is configured to monitor energy consumption of the HVAC system components, for example, by directly measuring the energy consumption of the HVAC system components or by estimating the energy usage of the one or more HVAC system components based on detecting usage of components of the HVAC system. The HVAC module 837 can communicate energy monitoring information and the state of the HVAC system components to the thermostat 834 and can control the one or more components of the HVAC system based on commands received from the thermostat 834.

The system 800 further includes one or more integrated security devices 880. The one or more integrated security devices can include any type of device used to provide alerts based on received sensor data. For instance, the one or more control units 810 may provide one or more alerts to the one or more integrated security input/output devices. Additionally, the one or more control units 810 may receive one or more sensor data from the sensors 820, 864a-b and determine whether to provide an alert to the one or more integrated security input/output devices 880.

The sensors 820, 864a-b, the automation module 822, the camera 830, the thermostat 834, and the integrated security devices 880 communicate with the controller 812 over communication links 824, 826, 828, 832, 884, and 886. The communication links 824, 826, 828, 832, 884, and 886 can be a wired or wireless data pathway configured to transmit signals from the sensors 820, 864a-b, the automation module 822, the camera 830, the thermostat 834, and the integrated security devices 880 to the controller 812. The sensors 820, the automation module 822, the camera 830, the thermostat 834, and the integrated security devices 880 may continuously transmit sensed values to the controller 812, periodically transmit sensed values to the controller 812, or transmit sensed values to the controller 812 in response to a change in a sensed value.

The communication links 824, 826, 828, 832, 884, and 886 can include a local network. The sensors 820, 864a-b, the automation module 822, the camera 830, the thermostat 834, and the integrated security devices 880, and the controller 812 may exchange data and commands over the local network. The local network can include IEEE 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 8 (CAT5) or Category 8 (CAT6) wired Ethernet network. The local network can be a mesh network constructed based on the devices connected to the mesh network.

The monitoring server 860 is an electronic device configured to provide monitoring services by exchanging electronic communications with the control unit 810, the one or more user devices 840, 850, and the central alarm station server 870 over the network 805. For example, the monitoring server 860 can be configured to monitor events (e.g., alarm events) generated by the control unit 810. In this example, the monitoring server 860 may exchange electronic communications with the network module 814 included in the control unit 810 to receive information regarding events (e.g., alerts) detected by the central alarm station server 870. The monitoring server 860 also may receive information regarding events (e.g., alerts) from the one or more user devices 840, 850.

In some implementations, the monitoring server 860 may route alert data received from the network module 814 or the one or more user devices 840, 850 to the central alarm station server 870. For example, the monitoring server 860 may transmit the alert data to the central alarm station server 870 over the network 805. The monitoring server 860 may store sensor data received from the monitoring system and perform analysis of sensor data received from the monitoring system. Based on the analysis, the monitoring server 860 may communicate with and control aspects of the control unit 810 or the one or more user devices 840, 850.

The central alarm station server 870 is an electronic device configured to provide alarm monitoring service by exchanging communications with the control unit 810, the one or more user devices 840, 850, and the monitoring server 860 over the network 805. For example, the central alarm station server 870 can be configured to monitor alerting events generated by the control unit 810. In this example, the central alarm station server 870 may exchange communications with the network module 814 included in the control unit 810 to receive information regarding alerting events detected by the control unit 810. The central alarm station server 870 also may receive information regarding alerting events from the one or more user devices 840, 850 and/or the monitoring server 860.

The central alarm station server 870 is connected to multiple terminals 872 and 874. The terminals 872 and 874 can be used by operators to process alerting events. For example, the central alarm station server 870 may route alerting data to the terminals 872 and 874 to enable an operator to process the alerting data. The terminals 872 and 874 can include general-purpose computers (e.g., desktop personal computers, workstations, or laptop computers) that are configured to receive alerting data from a server in the central alarm station server 870 and render a display of information based on the alerting data. For instance, the controller 812 may control the network module 814 to transmit, to the central alarm station server 870, alerting data indicating that a motion detection from a motion sensor via the sensors 820 or from a sound sensor 864a-b. The central alarm station server 870 may receive the alerting data and route the alerting data to the terminal 872 for processing by an operator associated with the terminal 872. The terminal 872 may render a display to the operator that includes information associated with the alerting event (e.g., the lock sensor data, the motion sensor data, the contact sensor data, etc.) and the operator may handle the alerting event based on the displayed information.

In some implementations, the terminals 872 and 874 can be mobile devices or devices designed for a specific function. Although FIG. 8 illustrates two terminals for brevity, actual implementations can include more (and, perhaps, many more) terminals. The one or more user devices 840, 850 are devices that host and display user interfaces. For instance, the user device 840 is a mobile device that hosts one or more applications (e.g., the smart home application 842). The user device 840 can be a cellular phone or a non-cellular locally networked device with a display. The user device 840 can include a cell phone, a smart phone, a tablet PC, a personal digital assistant ("PDA"), or any other portable device configured to communicate over a network and display information. For example, implementations may also include mobile communication devices, tablets, electronic organizers, portable music players, other communication devices, and handheld or portable electronic devices for gaming, communications, and/or data organization. The user device 840 may perform functions unrelated to the monitoring system, such as placing personal telephone calls, playing music, playing video, displaying pictures, browsing the Internet, maintaining an electronic calendar, etc.

The user device 840 includes a smart home application 842. The smart home application 842 refers to a software/firmware program running on the corresponding mobile device that enables the user interface and features described throughout. The user device 840 may load or install the smart home application 842 based on data received over a network or data received from local media. The smart home application 842 runs on mobile devices platforms, such as iPhone, iPod touch, Google Android, Windows Mobile, etc. The smart home application 842 enables the user device 840 to receive and process image and sensor data from the monitoring system.

The user device 850 can be a general-purpose computer (e.g., a desktop personal computer, a workstation, or a laptop computer) that is configured to communicate with the monitoring server 860 and/or the control unit 810 over the network 805. The user device 850 can be configured to display a smart home user interface 852 that is generated by the user device 850 or generated by the monitoring server 860. For example, the user device 850 can be configured to display a user interface (e.g., a web page) provided by the monitoring server 860 that enables a user to perceive images captured by the camera 830 and/or reports related to the monitoring system. Although FIG. 8 illustrates two user devices for brevity, actual implementations can include more (and, perhaps, many more) or fewer user devices.

In some implementations, the one or more user devices 840, 850 communicate with and receive monitoring system data from the control unit 810 using the communication link 838. For instance, the one or more user devices 840, 850 may communicate with the control unit 810 using various local wireless protocols such as Wi-Fi, Bluetooth, Zwave, ZigBee, HomePlug (Ethernet over powerline), or wired protocols such as Ethernet and USB, to connect the one or more user devices 840, 850 to local security and automation equipment. The one or more user devices 840, 850 may connect locally to the monitoring system and its sensors and other devices. The local connection may improve the speed of status and control communications because communicating through the network 805 with a remote server (e.g., the monitoring server 860) can be significantly slower.

Although the one or more user devices 840, 850 are shown as communicating with the control unit 810, the one or more user devices 840, 850 may communicate directly with the sensors 820 and other devices controlled by the control unit 810. In some implementations, the one or more user devices 840, 850 replace the control unit 810 and perform the functions of the control unit 810 for local monitoring and long range/offsite communication.

In other implementations, the one or more user devices 840, 850 receive monitoring system data captured by the control unit 810 through the network 805. The one or more user devices 840, 850 may receive the data from the control unit 810 through the network 805 or the monitoring server 860 may relay data received from the control unit 810 to the one or more user devices 840, 850 through the network 805. In this regard, the monitoring server 860 may facilitate communication between the one or more user devices 840, 850 and the monitoring system.

In some implementations, the one or more user devices 840, 850 can be configured to switch whether the one or more user devices 840, 850 communicate with the control unit 810 directly (e.g., through link 838) or through the monitoring server 860 (e.g., through network 805) based on a location of the one or more user devices 840, 850. For instance, when the one or more user devices 840, 850 are located close to the control unit 810 and in range to communicate directly with the control unit 810, the one or more user devices 840, 850 use direct communication. When the one or more user devices 840, 850 are located far from the control unit 810 and not in range to communicate directly with the control unit 810, the one or more user devices 840, 850 use communication through the monitoring server 860.

In some implementations, the one or more user devices 840, 850 are used in conjunction with local sensors and/or local devices in a house. In these implementations, the system 800 includes the one or more user devices 840, 850, the sensors 820, 864a-b, the automation module 822, and the camera 830. The one or more user devices 840, 850 receive data directly from the sensors 820, the automation module 822, and the camera 830, and send data directly to the sensors 820, the automation module 822, and the camera 830. The one or more user devices 840, 850 provide the appropriate interfaces/processing to provide visual surveillance and reporting. In some implementations, the system 800 provides end users with access to images captured by the camera 830 to aid in decision making. The system 800 may transmit the images captured by the camera 830 over a wireless WAN network to the user devices 840, 850.

In some implementations, a state of the monitoring system and other events sensed by the monitoring system can be used to enable/disable video/image recording devices (e.g., the camera 830). In these implementations, the camera 830 can be set to capture images on a periodic basis when the alarm system is armed in an "Away" state, but set not to capture images when the alarm system is armed in a "Stay" state or disarmed. In addition, the camera 830 can be triggered to begin capturing images when the alarm system detects an event, such as an alarm event, a door-opening event for a door that leads to an area within a field of view of the camera 830, or motion in the area within the field of view of the camera 830. In other implementations, the camera 830 may capture images continuously, but the captured images can be stored or transmitted over a network when needed.

The described systems, methods, and techniques can be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
   obtaining, by a controller, a sound sensor map of a building, the sound sensor map indicating locations of one or more first sound sensor devices in a first room of the building and one or more second sound sensor devices in a second room of the building;
   causing, by the controller, an autonomous device to navigate to the first room and to emit, during a time window, one or more sound patterns at one or more frequencies within the first room;
   receiving, by the controller, autonomous device location information that indicates a location of the autonomous device during the time window;
   receiving, by the controller, sound data comprising i) first sound data associated with sounds sensed by the one or more first sound sensor devices during the time window and ii) second sound data associated with sounds sensed by the one or more second sound sensor devices during the time window;
   generating, by the controller, a sound localization model based on the sound sensor map, the autonomous device location information, and the received sound data, wherein the sound localization model compensates for how sounds travels among rooms in at least a portion of the building such that an origin room of a sound source is identifiable; and
   storing, in a memory by the controller, a representation of the sound localization model.

2. The method of claim 1, comprising:
   receiving third sound data from the one or more first sound sensor devices, the one or more second sound sensor devices, or one or more third sound sensor devices;
   detecting a sound based on the third sound data; and
   identifying a room of the building that corresponds to an origin of the sound based on the third sound data and the sound localization model.

3. The method of claim 2, comprising:
   triggering a notification event based on the detected sound, the identified room, and one or more notification criteria.

4. The method of claim 2, wherein identifying the room of the building that corresponds to the origin of the sound comprises:
   determining, based on the sound localization model and the third sound data, sound origin likelihoods for a plurality of rooms in the building including the first room and the second room; and
   selecting a room to identify as the origin of the sound based on the sound origin likelihoods.

5. The method of claim 1, wherein generating the sound localization model comprises:
   generating a first sound localization model for the first room based on the sound sensor map, the autonomous device location information, and the received sound data such that the first sound localization model is usable to produce a value corresponding to a likelihood of a sound originating within the first room based on third sound data, the third sound data comprising data from the one or more first sound sensor devices, the one or more second sound sensor devices, or one or more third sound sensor devices; and
   generating a second sound localization model for the second room based on the sound sensor map, the autonomous device location information, and the received sound data such that the second sound localization model is usable to produce a value corresponding to a likelihood of a sound originating within the second room based on the third sound data.

6. The method of claim 1, comprising:
   receiving third sound data from the one or more first sound sensor devices, the one or more second sound sensor devices, or one or more third sound sensor devices;
   detecting a sound based on the third sound data;
   using the sound localization model to make a determination of whether the sound originate from inside the building or outside the building; and
   triggering a notification event based on the detected sound, the determination, and one or more notification criteria.

7. The method of claim 1, comprising:
   obtaining layout information of the building;
   causing, by the controller, the autonomous device to navigate through the building to collect sensor device location information regarding locations of sensor devices including the one or more first sound sensor devices and the one or more second sound sensor devices; and generating the sound sensor map based on the sensor device location information.

8. The method of claim 1, wherein the autonomous device comprises an aerial drone, and wherein the controller is configured to transmit commands to the aerial drone.

9. A system comprising:
a memory configured to store information comprising a sound sensor map of a building, the sound sensor map indicating locations of one or more first sound sensor devices in a first room of the building and one or more second sound sensor devices in a second room of the building; and
a processor coupled with the memory, wherein the processor is configured to perform operations comprising:
causing an autonomous device to navigate to the first room and to emit, during a time window, one or more sound patterns at one or more frequencies within the first room, receiving autonomous device location information that indicates a location of the autonomous device during the time window,
receiving sound data comprising i) first sound data associated with sounds sensed by the one or more first sound sensor devices during the time window and ii) second sound data associated with sounds sensed by the one or more second sound sensor devices during the time window,
generating a sound localization model based on the sound sensor map, the autonomous device location information, and the received sound data, wherein the sound localization model compensates for how sounds travels among rooms in at least a portion of the building such that an origin room of a sound source is identifiable, and
storing a representation of the sound localization model in the memory.

10. The system of claim 9, wherein the operations comprise:
receiving third sound data from the one or more first sound sensor devices, the one or more second sound sensor devices, or one or more third sound sensor devices;
detecting a sound based on the third sound data; and
identifying a room of the building that corresponds to an origin of the sound based on the third sound data and the sound localization model.

11. The system of claim 10, wherein the operations comprise:
triggering a notification event based on the detected sound, the identified room, and one or more notification criteria.

12. The system of claim 10, wherein identifying the room of the building that corresponds to the origin of the sound comprises:
determining, based on the sound localization model and the third sound data, sound origin likelihoods for a plurality of rooms in the building including the first room and the second room; and
selecting a room to identify as the origin of the sound based on the sound origin likelihoods.

13. The system of claim 9, wherein generating the sound localization model comprises:
generating a first sound localization model for the first room based on the sound sensor map, the autonomous device location information, and the received sound data such that the first sound localization model is usable to produce a value corresponding to a likelihood of a sound originating within the first room based on third sound data, the third sound data comprising data from the one or more first sound sensor devices, the one or more second sound sensor devices, or one or more third sound sensor devices; and
generating a second sound localization model for the second room based on the sound sensor map, the autonomous device location information, and the received sound data such that the second sound localization model is usable to produce a value corresponding to a likelihood of a sound originating within the second room based on the third sound data.

14. The system of claim 9, wherein the operations comprise:
receiving third sound data from the one or more first sound sensor devices, the one or more second sound sensor devices, or one or more third sound sensor devices;
detecting a sound based on the third sound data;
using the sound localization model to make a determination of whether the sound originate from inside the building or outside the building; and
triggering a notification event based on the detected sound, the determination, and one or more notification criteria.

15. The system of claim 9, wherein the operations comprise:
obtaining layout information of the building;
causing the autonomous device to navigate through the building to collect sensor device location information regarding locations of sensor devices including the one or more first sound sensor devices and the one or more second sound sensor devices; and
generating the sound sensor map based on the sensor device location information.

16. The system of claim 9, wherein the autonomous device comprises an aerial drone, and wherein the processor is configured to transmit commands to the aerial drone.

17. A non-transitory computer-readable storage medium comprising at least one program for execution by at least one processor of a device, the at least one program including instructions which, when executed by the at least one processor, cause the device to perform operations comprising:
obtaining a sound sensor map of a building, the sound sensor map indicating locations of one or more first sound sensor devices in a first room of the building and one or more second sound sensor devices in a second room of the building;
receiving autonomous device location information that indicates a location of an autonomous device during a time window when the autonomous device emitted one or more sound patterns at one or more frequencies within the first room;
receiving sound data comprising i) first sound data associated with sounds sensed by the one or more first sound sensor devices during the time window and ii) second sound data associated with sounds sensed by the one or more second sound sensor devices during the time window;
generating a sound localization model based on the sound sensor map, the autonomous device location information, and the received sound data, wherein the sound localization model compensates for how sounds travels among rooms in at least a portion of the building such that an origin room of a sound source is identifiable; and
storing a representation of the sound localization model.

18. The computer-readable storage medium of claim 17, wherein the operations comprise:
- receiving third sound data from the one or more first sound sensor devices, the one or more second sound sensor devices, or one or more third sound sensor devices;
- detecting a sound based on the third sound data; and
- identifying a room of the building that corresponds to an origin of the sound based on the third sound data and the sound localization model.

19. The computer-readable storage medium of claim 18, wherein the operations comprise:
- triggering a notification event based on the detected sound, the identified room, and one or more notification criteria.

20. The computer-readable storage medium of claim 18, wherein identifying the room of the building that corresponds to the origin of the sound comprises:
- determining, based on the sound localization model and the third sound data, sound origin likelihoods for a plurality of rooms in the building including the first room and the second room; and
- selecting a room to identify as the origin of the sound based on the sound origin likelihoods.

21. The computer-readable storage medium of claim 17, wherein generating the sound localization model comprises:
- generating a first sound localization model for the first room based on the sound sensor map, the autonomous device location information, and the received sound data such that the first sound localization model is usable to produce a value corresponding to a likelihood of a sound originating within the first room based on third sound data, the third sound data comprising data from the one or more first sound sensor devices, the one or more second sound sensor devices, or one or more third sound sensor devices; and
- generating a second sound localization model for the second room based on the sound sensor map, the autonomous device location information, and the received sound data such that the second sound localization model is usable to produce a value corresponding to a likelihood of a sound originating within the second room based on the third sound data.

22. The computer-readable storage medium of claim 17, wherein the operations comprise:
- receiving third sound data from the one or more first sound sensor devices, the one or more second sound sensor devices, or one or more third sound sensor devices;
- detecting a sound based on the third sound data;
- using the sound localization model to make a determination of whether the sound originate from inside the building or outside the building; and
- triggering a notification event based on the detected sound, the determination, and one or more notification criteria.

23. The computer-readable storage medium of claim 17, wherein the operations comprise:
- obtaining layout information of the building;
- causing the autonomous device to navigate through the building to collect sensor device location information regarding locations of sensor devices including the one or more first sound sensor devices and the one or more second sound sensor devices; and
- generating the sound sensor map based on the sensor device location information.

* * * * *